(12) United States Patent
Punaganti Venkata et al.

(10) Patent No.: US 7,289,616 B2
(45) Date of Patent: Oct. 30, 2007

(54) USER-CONFIGURABLE CALL ANSWERING/REDIRECTION MECHANISM

(75) Inventors: Murali Krishna Punaganti Venkata, Vantaa (FI); Chand Malu, Vantaa (FI)

(73) Assignee: Nokia Corporation, Espoo (FI)

( * ) Notice: Subject to any disclaimer, the term of this patent is extended or adjusted under 35 U.S.C. 154(b) by 103 days.

(21) Appl. No.: 10/527,105

(22) PCT Filed: Sep. 17, 2003

(86) PCT No.: PCT/FI03/00679

§ 371 (c)(1),
(2), (4) Date: Aug. 12, 2005

(87) PCT Pub. No.: WO2004/028171

PCT Pub. Date: Apr. 1, 2004

(65) Prior Publication Data

US 2006/0233338 A1    Oct. 19, 2006

(30) Foreign Application Priority Data

Sep. 18, 2002    (FI)    .................................. 20021664

(51) Int. Cl.
*H04M 3/42*    (2006.01)
(52) U.S. Cl. .................... 379/201.06; 379/201.07; 379/201.08; 379/211.01; 379/88.18; 379/88.2
(58) Field of Classification Search .......... 379/201.06, 379/201.07, 201.08, 211.01, 211.02, 88.18, 379/88.2
See application file for complete search history.

(56) References Cited

U.S. PATENT DOCUMENTS

| | | | | |
|---|---|---|---|---|
| 5,329,578 A | * | 7/1994 | Brennan et al. | ....... 379/211.03 |
| 5,889,845 A | * | 3/1999 | Staples et al. | ......... 379/211.02 |
| 6,125,178 A | * | 9/2000 | Walker et al. | ......... 379/211.01 |
| 2002/0027880 A1 | | 3/2002 | Mesiwala | |
| 2002/0085701 A1 | * | 7/2002 | Parsons et al. | ........ 379/211.01 |
| 2002/0155828 A1 | | 10/2002 | Tuomainen et al. | |

FOREIGN PATENT DOCUMENTS

| | | |
|---|---|---|
| EP | 0 861 006 A1 | 8/1998 |
| WO | WO 99/48314 | 9/1999 |
| WO | WO 00/42809 | 7/2000 |
| WO | WO 01/56305 | 8/2001 |
| WO | WO 02/089517 | 11/2002 |

* cited by examiner

*Primary Examiner*—Quynh H. Nguyen
(74) *Attorney, Agent, or Firm*—Squire, Sanders & Dempsey L.L.P.

(57) ABSTRACT

Very flexible call management is achieved by a method for handling a call setup request (7-10, 7-22, . . . ) from A party (A1 . . . A9) to a B party (511). A reachability server (RS) receives (7-0) the B party's multiple simultaneous caller groups, profiles, redirection settings and associations thereof. Each time the B party's reachability changes, he indicates his current profile (7-20, 7-40, 7-50). Based on the call setup request, the server (RS) determines the A party's identity. Based on the A identity, one of the multiple simultaneous caller groups is determined. Then one of the multiple associations that corresponds to the determined caller group and the current B party is determined. Finally, the call setup request is processed according to the redirection setting of the determined association. The redirection settings may indicate a changed call mode, such as chatting, in case the B party is unable to take a voice call.

22 Claims, 8 Drawing Sheets

Fig. 3

| | 31 | 32 |
|---|---|---|
| 301 | OfficeFirst | 5sOffice# / 5sMobile# / Answer# |
| 302 | MobileFirst | 5sMobile# / Answer# |
| 303 | VoiceMail | Answer# |
| 304 | Secretary | Secretary# |
| 305 | URL1 | >www.addr1.fi |
| 306 | URL2 | >www.addr2.fi |
| 307 | Chat | >Chat<Chat |
| 308 | Voice/Chat | <Chat |
| 309 | Voice/2KeyChat | <2KeyChat |

Fig. 4

| | Profile | Caller group | Redirection setting |
|---|---|---|---|
| 401 | Work | Family | OfficeFirst |
| 402 | Work | Colleagues | OfficeFirst |
| 403 | Work | Secretary | OfficeFirst |
| 404 | Work | Friends | Secretary |
| 405 | Work | (Others) | Secretary |
| 406 | Work | (Unknown) | Secretary |
| 411 | Meeting | Family | Chat |
| 412 | Meeting | Colleagues | Chat |
| 413 | Meeting | Secretary | MobileFirst |
| 414 | Meeting | Friends | VoiceMail |
| 415 | Meeting | (Others) | VoiceMail |
| 421 | Theatre | Family | Voice/2KeyChat |
| 431 | Abroad | (Unknown) | VoiceMail |
| | ... | ... | ... |

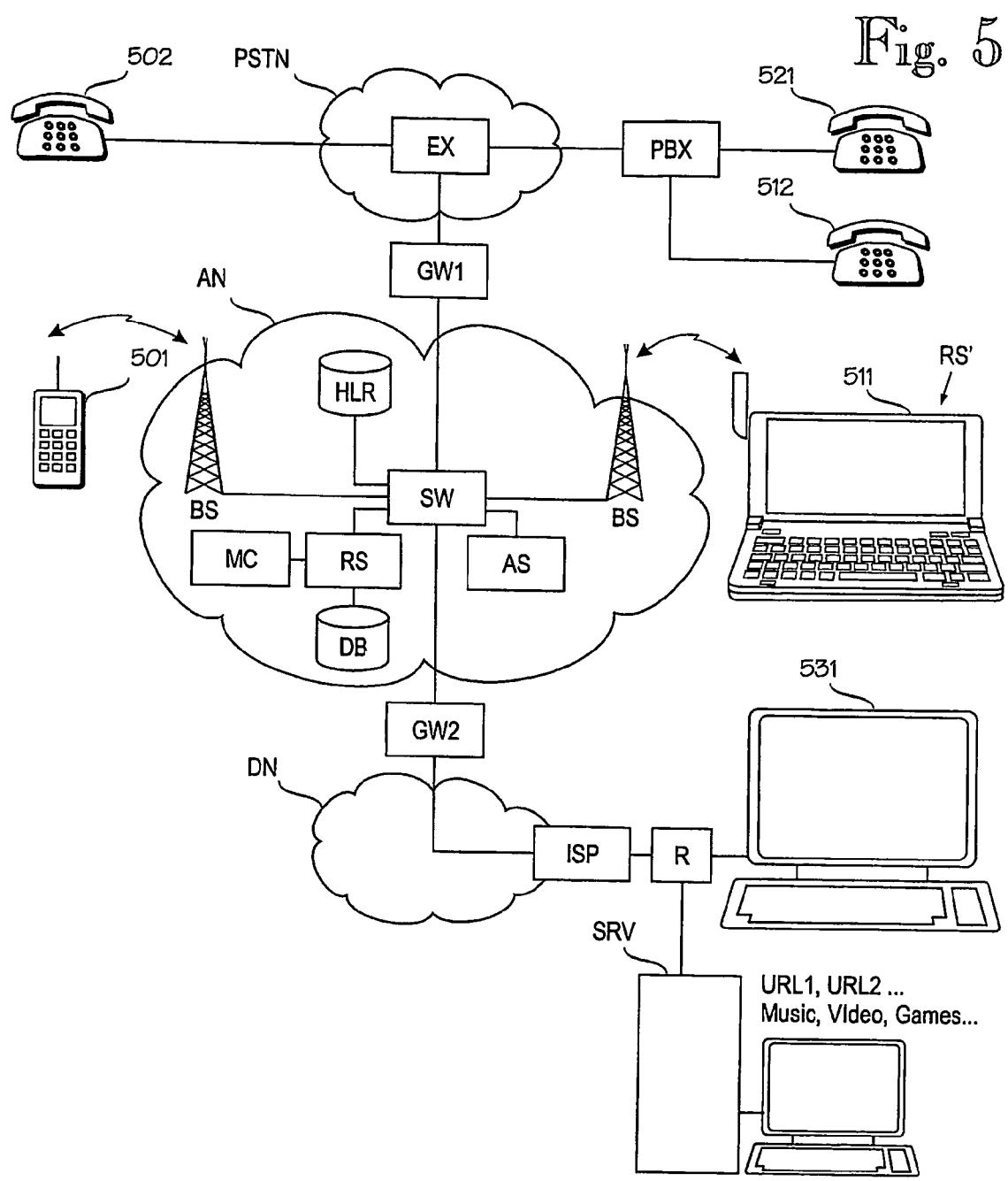

USER-CONFIGURABLE CALL ANSWERING/REDIRECTION MECHANISM

BACKGROUND OF THE INVENTION

The invention relates to methods and equipment for implementing a user-configurable call answering/redirection mechanism.

For example, in a GSM system, call forwarding to a number 123456 can be implemented by dialling a character string *21*#123456#. This character string, though rather complicated, can only be used for configuring a very simple service: in the above example the call is unconditionally forwarded to a given fixed number. Special characters delivered from a keypad are very difficult to use for configuring a service such as a reachability profile in which a call is during office hours attempted first to an office telephone for 5 seconds, next a mobile phone for 8 seconds and if this also fails, the call is transferred to a voice mail service. Outside office hours the call is first attempted to a home telephone.

A problem in conventional call answering/redirection mechanism is thus that unreasonably long character strings have to be entered from the user interface of a mobile terminal. This takes a lot of time and demands great precision from the user.

Co-assigned PCT application WO 99/48314 discloses a technique in which a service configuration routine is installed in a mobile station. The contents of said WO 99/48314 are incorporated herein by reference. The service configuration routine enables a user to edit pre-existing reachability profiles, instead of keying everything from scratch. But even this technique fails to fully support third generation multi-mode user terminals. As used herein, a multi-mode user terminal means a user terminal that is capable of several modes of communication, such as speech, short-message service, chat, or the like.

BRIEF DESCRIPTION OF THE INVENTION

An object of the present invention is to provide methods and equipment for implementing a user-configurable call answering/redirection mechanism such that the call answering/redirection mechanism is convenient for the user. The object of the invention is achieved by the methods and equipment which are characterized by what is stated in the independent claims. The preferred embodiments of the invention are disclosed in the dependent claims.

An aspect of the invention is a method for processing a call setup request from an A party to a B party. The method comprises maintaining, for the B party, multiple simultaneous caller groups, multiple simultaneous profiles, multiple simultaneous redirection settings, and multiple simultaneous associations of a caller group, a profile and a redirection setting. Each time the B party wishes to change their reachability settings (call answering/redirection settings) the B party indicates a current (reachability) profile. When an A party wishes to place a call to the B party, the A partys identity is determined. Based on the A party's identity, a caller group comprising the A party's identity is determined. Then an association comprising that caller group is determined. Finally, the attempted call is processed according to the redirection setting of the identified association.

Another aspect of the invention is a reachability server for implementing the above method. As used herein, a reachability server is something that provides a service. The reachability server may be a separate server or an attachment to pre-existing call processing equipment, such as a mobile switching centre or private branch exchange. Or, the reachability server may be implemented as a software agent in the user equipment. As a further alternative, the reachability server may be implemented as a distributed collection of software, such as a client/server system.

Within the context of this invention, the term "call" is used in a broad sense. The term "call", in contexts like "call attempt" or "call setup request", should be interpreted to mean any two-way communication, including, but not limited to a voice call, data call, chat connection, limited (or prompted) chat, or the like.

The invention is based on the idea of separating the reachability profile (or simply: profile) from the redirection settings and maintaining, for each participating user, multiple simultaneous caller groups, multiple simultaneous profiles, multiple simultaneous redirection settings, and multiple simultaneous associations of a caller group, profile and redirection setting. None of the above data needs to be changed when the user wishes to change their reachability settings. Assuming that a suitable association of a caller group, profile and redirection setting has been defined earlier, all the user has to do is indicate one of the existing profiles. Because the associations remain unchanged over a long time, the user does not have to change or re-enter the redirection settings.

As used herein, a caller group means a set or group of potential callers (future A parties) sharing similar redirection settings. A call group can comprise one or several members.

A redirection setting is an essential element of the invention. The redirection setting is a parameter that is used to answer the following question: what to do with a call setup request? The redirection setting indicates one or both of the following: 1) where (and whether) the call is redirected, and 2) which mode the call is changed into. An example of the first alternative is a setting which determines that an incoming call is to be redirected to a different number (or other network address). For example, a redirection setting may indicate that a call is first attempted to the B party's user terminal for five seconds, then to a home number for 10 seconds and then to an answering service. Alternatively, a call may be routed to an Internet address, either temporarily or during waiting. An example of the second alternative is a setting which determines that the call mode of an incoming call is changed to chat. In other words, if a voice call cannot be established, a chat connection may be set up instead. Thus the redirection setting may include a call mode indicator that indicates a changed call mode. For example, the changed call mode may indicate a silent communication for one or both of the parties. In this context, "silent communication" means that one or both parties do not speak to a telephone. Silent communication can be implemented by chatting or limited chatting. Chatting means typing arbitrary text responses. Limited chatting means selecting one of a small number of possible responses. For example, the silent party may select a response from a touch-sensitive screen of the terminal. An even less disturbing implementation of limited chatting is called 2-key chatting. 2-key chatting means that the silent party can listen to the speaking party by means of an earphone but responds by using a small number (typically 2 or 3) of different keys and/or keystrokes (single click, double click and/or long press). The silent party's responses can be converted to speech in a voice synthesizer, so that the other party can carry out a fairly normal voice call. Such an asymmetric call can be useful if the B party is in a situation in which it is socially unacceptable to speak to a telephone.

An advantage of the invention is that it is very easy for users to change their reachability settings, even when there are multiple caller groups, all requiring different reachability settings. Because the profiles are separated from the redirection settings, the profiles may be very simple and, in a simple embodiment, only a profile name or indicator is necessary.

It was stated earlier that the invention is preferably implemented by co-operation between the B party's terminal and an element in the fixed network. This co-operation is further improved by setting the alarm of the B party's terminal automatically to silent/vibrating if the current profile of the B party indicates silent communication.

Preferably, the profiles comprise presence information and/or instructions which is/are returned to the A party. For example, the presence information/instructions may indicate "I am in a meeting, please dial 1 if you wish to leave a message, or, dial 2 if you have urgent business; I can reply by chatting".

BRIEF DESCRIPTION OF THE DRAWINGS

In the following the invention will be described in greater detail by means of preferred embodiments with reference to the attached drawings, in which:

FIG. 3 illustrates redirection settings;
FIG. 4 illustrates associations of caller groups, reachability profiles and redirection settings;
FIG. 5 is a block diagram illustrating a network architecture for implementing the invention.

DETAILED DESCRIPTION OF THE INVENTION

Within this detailed description, the name "Bill" refers to the terminal user whose incoming calls will be processed according to the invention. The reason for this name is that Bill will be acting the called or B party during a call, and "Bill" begins with a B. However, he may be an A (originating) party when he changes his reachability settings via a remote reachability server (or when he makes other outgoing calls) and he is not a party to any call when he changes settings only within his terminal.

Figure 1:
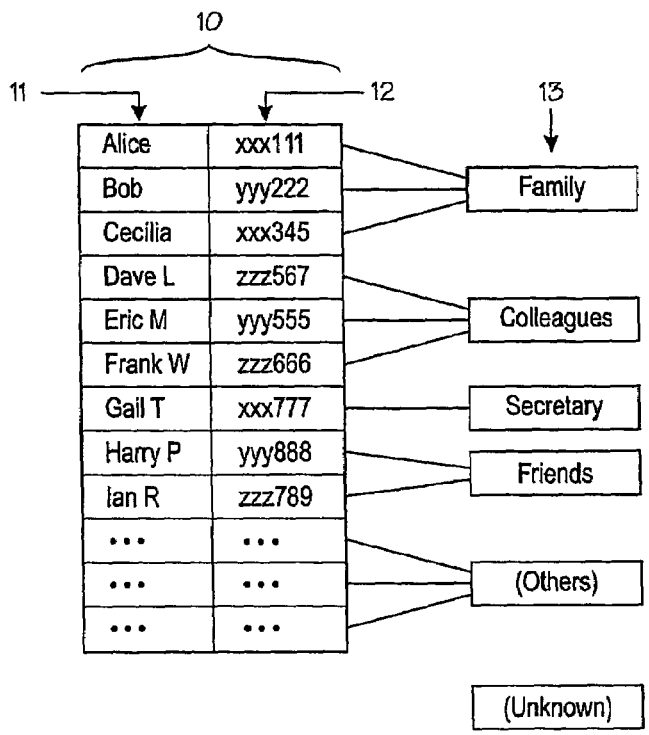
FIG. 1 illustrates user records and caller groups.

FIG. 1 illustrates Bill's address book 10 and caller groups 13. The address book 10 is basically similar to the address book stored in a SIM card that is attached to a GSM mobile telephone. The address book contains a record for each of Bill's contacts (persons or companies). Each record comprises a name field 11 and a number (or address) field 12. The name field 11 contains a free-format name, as is well known from conventional GSM telephones. The number/address field 12 may contain a conventional telephone number or any usable network address, such as an MSISDN number, TCP/IP address, e-mail address or the like.

Reference numeral 13 generally denotes Bill's caller groups. In this example, a caller group "Family" consists of the records for Alice, Bob and Cecilia. Another caller group "Colleagues" consists of the records for Dave L, Eric M and Frank W. The third caller group "Secretary" only comprises Bill's secretary Gail T. The fourth caller group "Friends" comprises Harry P and Ian R. The four first caller groups are formed explicitly, such that Bill explicitly adds records 10 (potential callers) to one of the caller groups 13.

In addition to explicit caller groups, there may be implicit caller groups, two of which are shown in FIG. 1. In this example, a first implicit caller group "others" comprises all the records 10 in the terminal's address book that do not belong in any of the explicit caller groups. As soon as a record 10 is added to one of the explicit caller groups, that record is removed from the "Others" group. The caller group "Others" may be used to indicate how to process calls from persons that are listed in Bill's address book 10 but do not belong in any of the explicit caller groups. Another implicit caller group "Unknown" comprises persons that are not stored in Bill's address book. The caller group "Unknown" may be used to indicate how to process calls from persons that are not known to the called party.

As regards the association of the records 10 and caller groups 13, what really matters to the reachability server/service is the association of a number/address field 12 and a caller group 13. This is because the reachability server detects the caller's identity based on the caller's number (or other network address) 12. For the reachability server (and call processing in general), the name 11 is irrelevant. From Bill's point of view, however, it is much more convenient to associate a caller group 13 to a name 11 than to a number 12.

Figure 2:
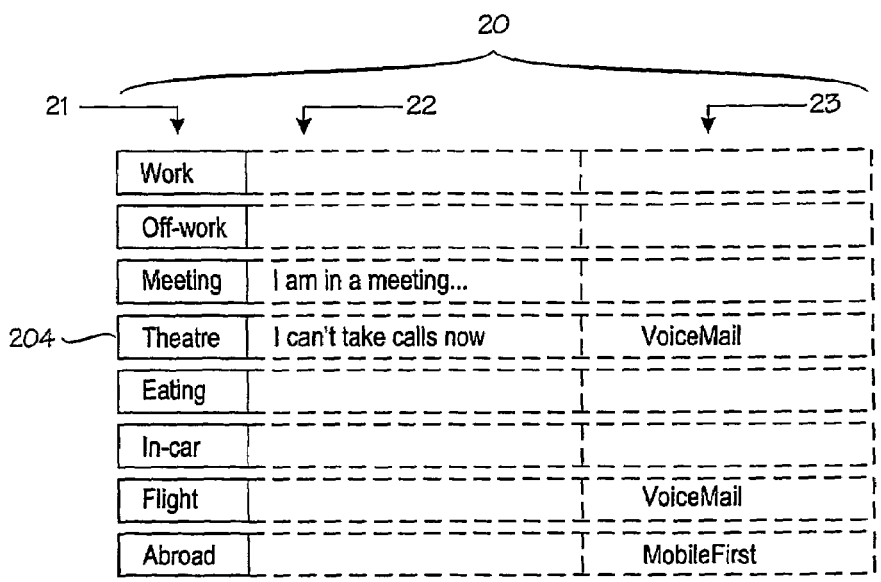
FIG. 2 illustrates reachability profiles.

FIG. 2 illustrates reachability profiles 20. Each reachability profile 20 comprises at least a label (or identifier) field 21. According to a preferred embodiment of the invention, a reachability profile 20 may also comprise a free-format presence information 22. For example, the reachability profile "Meeting" comprises a presence information field 22 whose contents is "I am in a meeting . . . " This presence information may be returned to a caller if the called party cannot answer calls.

According to another preferred embodiment of the invention, a reachability profile 20 may also comprise a default redirection setting field 23. The use of redirection settings will be explained in connection with FIG. 3.

FIG. 3 illustrates Bill's redirection settings 30. Each redirection settings record consists of a label (or identifier) field 31 and an actual redirection setting field 32. The label/identifier field 31 is preferably a free-format field, whereby Bill can enter short but descriptive names. From the point of view of the reachability server, however, any identifier is usable. The first redirection settings record 301 has a label field 31 of "OfficeFirst" and a redirection setting field 32 of "5sOffice# /5sMobile# / Answer#". Herein, "Office#" stands for Bill's office telephone number, Mobile# stands for his mobile terminal number and Answer# stands for the number of the answering service (voice mail). The redirection setting field 32 of "5sOffice# / 5sMobile# / Answer#" is interpreted so that a call to the office number is attempted first for five seconds, then the mobile terminal's number is attempted for another five seconds, and if that fails too, the call is redirected to the answering service. The next two records 302 and 303 are self-explanatory based on the previous example. The fourth redirection settings record 304 means that an incoming call will be redirected to the telephone of Bill's secretary. Records 305 and 306 indicate that a caller is redirected to URL addresses www.addr1.fi and www.addr2.fi, respectively. For instance, www.addr1.fi may be the address of a web page informing that the terminal user is unable to receive calls, and www.addr2.fi may be the address of a more informative web page for more trusted callers.

Instead of a different number or network address, or in addition to it, the redirection setting field 32 may indicate a change of call mode. For instance, Bill may be in a library in which it is socially unacceptable to speak to the telephone but Bill may be able to chat via the telephone's keyboard or keypad. According to a further preferred embodiment, the call mode is processed separately for each half-call or direction of call, that is, for the incoming and outgoing directions. For instance, when eating in the restaurant, Bill may not be able to speak to the telephone but may be able to listen to the caller's voice and respond via a chat connection.

In the example shown in FIG. 3, the ">" and "<" signs mean change of call mode in the incoming and outgoing directions, respectively. For instance, redirection settings record 307, labelled "Chat", has a redirection setting of ">Chat<Chat" which means that both the incoming and outgoing half-calls are converted to chat mode. The next record 308, labelled "Voice/Chat", has a redirection setting of "<Chat" which means that only the outgoing half-call is converted to chat mode.

The last record 309, labelled "Voice/2KeyChat", has a redirection setting of "<2KeyChat" which means that the outgoing half-call is converted to 2-key chat mode. The 2-key chat mode in the outgoing direction means that the mobile terminal user is able to listen to the caller's voice but is only able to respond with a very small number of keys, such as two or three. The two keys can be "yes" and "no". An optional third key may mean "I don't know/understand". The 2- (or 3-) key chat mode is useful in a situation where even conventional chatting is impossible. For instance, Bill may be in a concert, and calls from most caller groups are redirected to voice mail but calls from a babysitter are converted to 2-key chat mode. The babysitter, who may be facing an urgent problem, calls Bill. The alarm of Bill's terminal is set to silent but vibrating. As soon as Bill feels the vibrating alarm, he can place an earphone to his ear and take the call. The babysitter may then describe the situation and ask questions that can be answered by "yes" and "no" keys which Bill can memorize and use without taking the terminal out of his trouser pocket.

As an alternative to the two or three different keys, different keystrokes can be used. For example, a short key click means "yes", a long key press means "no" and two clicks means "I don't know/understand". For example, two different keys and three different keystrokes give a total of six combinations.

FIG. 4 illustrates associations 40 of (reachability) profiles 41, caller groups 42 and redirection settings 43. The first association 401 associates profile "Work" and caller group "Family" with redirection setting "OfficeFirst". This means that whenever profile "Work" is Bill's current profile, calls from members of the "Family" group are processed according to redirection setting "OfficeFirst". This redirection setting was described as record 301 in FIG. 3. In the example shown in FIG. 4, there are six associations, namely 401 to 406, for the profile "Work". Associations 401 to 403 specify that calls from members of the "Family", "Colleague" and "Secretary" groups are processed according to redirection setting "OfficeFirst", while calls from "Friends", "Others" and "Unknown" groups are processed according to redirection setting "Secretary", which means that the call is routed to Bill's secretary.

The example shown in FIG. 4 does not have an association for each combination of profile, caller group and redirection setting. This is because this example makes use of the (optional) default redirection setting field 23 shown in FIG. 2. For instance, the profile "Abroad" has a default redirection setting of "MobileFirst" which is used unless an overriding association for some caller groups have been specified. FIG. 4 shows an association 431 of profile "Abroad", caller group "Unknown" and redirection setting "VoiceMail". This means that when Bill is abroad, he does not wish to take calls from unknown callers because he would have to pay for those calls. Accordingly, calls from unknown callers are routed to voice mail.

FIG. 5 is a block diagram illustrating a network architecture for implementing the invention. Reference numeral 511 denotes Bill's mobile terminal. It is connected to an access network AN. The access network AN can use any network technology capable of processing calls, including but not limited to GSM, UMTS or WLAN with VoIP. The access network AN has base stations BS to provide a radio interface to user terminals 501, 511. One or more switching elements SW route calls, via different base stations, to different terminals. For example, in a GSM network, the switching elements are mobile services switching centres (MSC). A Home Location Register HLR stores subscriber data. An answering server AS provides voice mail services when Bill is unable to receive calls.

The access network AN is connected to other networks via gateway elements GW1 and GW2. In this example, the other networks are a Public Switched Telephone Network PSTN and a data network DN, such as the Internet and/or its closed subnetworks, commonly called intranets or extranets. The PSTN comprises an exchange, for routing calls. In this example, Bill's office has a private branch exchange PBX to which Bill's telephone 512 and his secretary's telephone 521 are connected. A third telephone 502 represents other potential callers via the PSTN. Bill's office computer 531 is connected to the data network DN via an Internet service provider ISP and a router R.

The elements of FIG. 5 described above are or can be entirely conventional. In addition to the conventional elements, the network architecture comprises a reachability service function that implements the method according to the invention. In the example shown in FIG. 5, the reachability service function is implemented as a reachability server RS that is closely coupled to the switching element SW. The reachability server RS comprises or is connected to a database DB that stores the caller lists, profiles, redirection settings and the associations between them.

It should be understood that the placement of the reachability server RS in the access network is only an exemplary embodiment, and the RS can be placed in the data network DN. The optimal implementation of the RS depends on the service provider. If the access network operator provides the reachability service, the reachability server RS is preferably located in the access network AN. On the other hand, if reachability service is provided by an operator distinct from the AN operator, the reachability server RS is preferably located in the data network DN.

Instead of a centralized reachability server RS, or in addition to it, there may distributed reachability servers RS' in advanced terminals, wherein each terminal-based reachability server RS' serves a single user. An advantage of a terminal-based reachability server RS' is that its operation is largely independent of the current access network. In other words, its services are available even if Bill is roaming abroad. On the other hand, a centralized reachability server RS installed in one of the networks is available when the terminal is disconnected from the network.

Thus an optimal implementation of the reachability service is achieved by a combination of a centralized reachability server RS and a terminal-based reachability server RS'. For example, terminals capable of multimedia operations have sufficient memory for acting as a voice mail box (answering service). An advantage of a voice mail box in a terminal is that the terminal can inform the caller that the call cannot be answered and store a voice message from the caller, without disturbing people near the terminal. A terminal-provided voice mail box is independent from the current access network operator. Such a terminal-based implementation will be further described in connection with FIG. 11.

According to another preferred embodiment of the invention, the arrangement comprises one or more servers to provide additional services to a caller when the called party is having another call or is unable to take the call. In this example, one server SRV is installed in Bill's office and is connected to the office router R. It is common practice to play music to a caller when the called party is having another call or the switchboard is congested. The invention can be used to provide more advanced services to a waiting caller. For example, the server SRV may provide information in the form of URL addresses ULR1 and URL2, etc. Or, the server may show a video to the caller or allow the caller to play games, assuming that the caller is using a multimedia-enabled terminal.

According to a further preferred embodiment of the invention, the reachability server RS comprises or cooperates with a mode conversion function. An example of such a function is shown as a distinct mode converter MC. The mode conversion function helps to convert calls from one mode to another. For instance, it was stated earlier that a chat connection can be established if the called party cannot talk to a telephone. But then the calling party may be in a situation where chatting is impossible. To solve this problem, the mode converter MC (or an equivalent function in the terminal) comprises a speech synthesizer and/or recognition equipment. For instance, assume that Alice is calling Bill, and Alice cannot chat and Bill cannot talk. In such a situation, the call mode may be changed to voice/chat which means that Alice's speech is conveyed as such to Bill but Bill's chat response is converted to synthesized speech and conveyed to Alice.

Preferably, the reachability server RS and the mode converter MC (or equivalent functions in other network elements) support as many as possible from the following redirections and mode changes:

1. redirection to another telephone;
2. redirection to voice mail;
3. timed redirection to another telephone/voice mail (e.g. five seconds to office phone, 5 seconds to mobile phone, then to voice mail;
4. sending the caller a data message, such as a short message or an MMS (Multimedia Messaging Specification) message, or a partial or whole web page;
5. sending the caller a network address, such as a URL, preferably formatted as a link, wherein the network address containing more detailed information;
6. conversion of incoming and/or outgoing call to chat or limited chat (e.g. 2-key chat);
7. conversion of incoming and/or outgoing voice to text or vice versa;
8. providing additional services (music, video, games . . . ) during waiting;
9. personalized voice answering in the answer service (network-based or terminal based); that is, the voice information depends on A's caller group and B's current profile;

Option 6 is implemented without text-to-speech or speech-to-text conversion. That is, if B can only chat but not talk, then a chat connection is established in at least one direction. For instance, A can talk to B but B will type his responses. Alternatively, both parties can resort to chatting. Option 7 requires text-to-speech or speech-to-text conversion. For instance, A can talk and B's typed responses are converted to speech.

Figure 6:
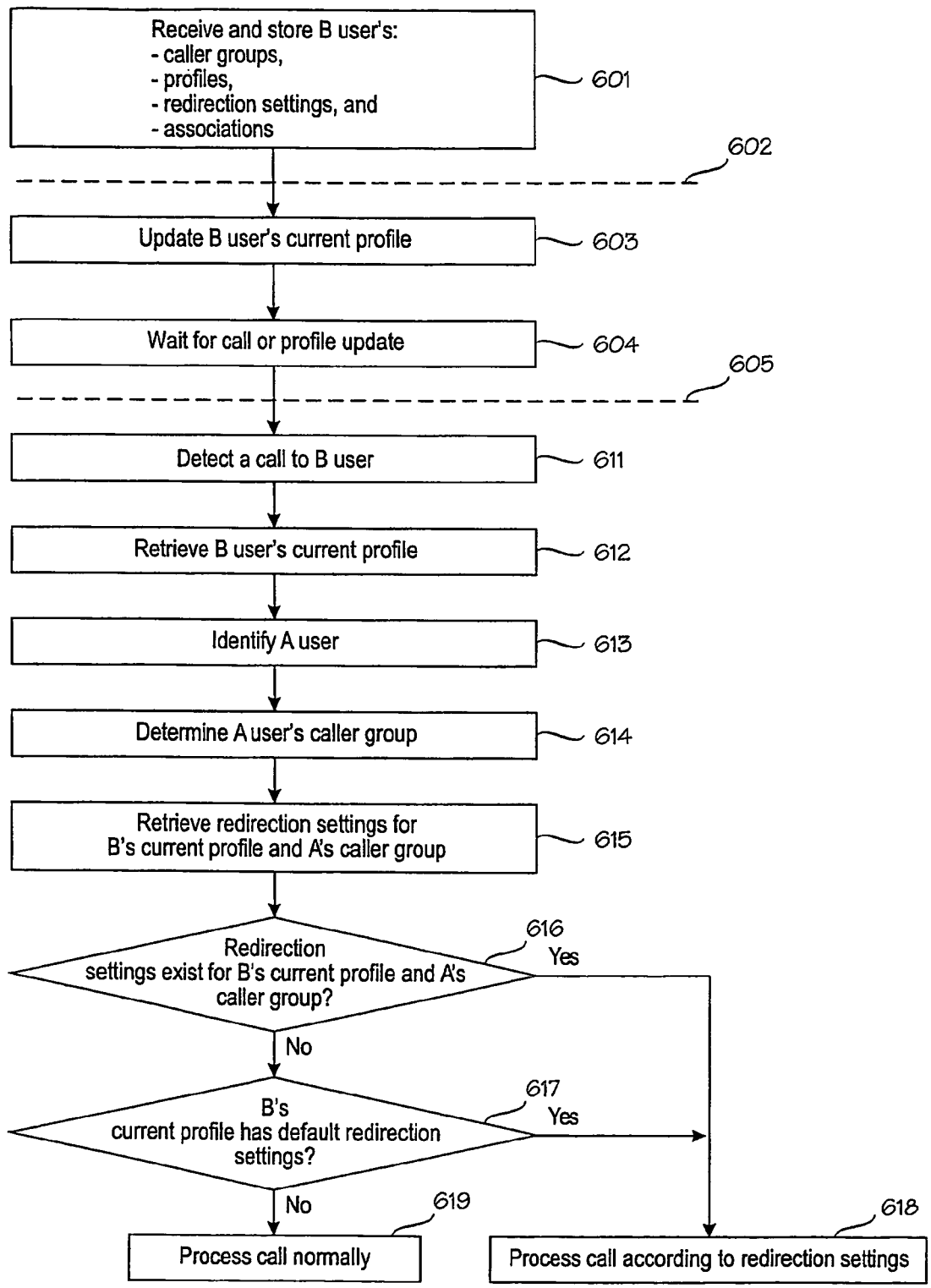
FIG. 6 is a flow chart illustrating the operation of a reachability server.

FIG. 6 is a flow chart illustrating the operation of a reachability server. In step 601, the reachability server receives and stores into memory Bill's caller lists 10 (of which only field 12 is essential) and caller groups 13 (see FIG. 1), his profiles 20 (see FIG. 2), redirection settings 30 (see FIG. 3) and associations 40 of the above three types of data (see FIG. 4). Step 601 can take place in one go or in a distributed manner. In other words, Bill can indicate the settings 10, 13, 20, 30 and 40 during one session, or he may update previous settings.

Dashed lines 602 and 605 denote occasions in which the reachability server waits for more actions from Bill or a caller, respectively. In step 603, Bill's reachability settings change and he updates his current profile in the reachability server. In other words, he indicates a current one of the pre-existing profiles stored in the reachability server. For instance, if Bill is about to enter an airplane, he selects "Flight" as his current profile.

The remaining steps 611 to 618 relate to processing of one call. In step 611, the reachability server detects a call to Bill from an A user. In step 612, the reachability server retrieves Bill's current profile. In step 613, the reachability server determines the A user's identity. For example, the A user can be identified by means of a Calling Line Indicator (CLI). In step 614, the reachability server determines the A user's caller group, that is, the caller group 13 corresponding to the A user's identity 11. In step 615, the reachability server attempts to retrieve the redirection settings record 40 corresponding to the A user's caller group 13 and Bill's current profile 20. In step 616, it is checked if such a redirection settings record could be determined, which means that there was an association corresponding to the A user's identity and Bill's current profile. If yes, the process continues to step 618 in which the call is processed according to the redirection settings.

According to a preferred embodiment, if the check in step 616 failed, the process continues to step 617 in which it is checked if Bill's current profile indicates a default redirection setting. For instance, each of the profiles "Theatre", "Flight" and "Abroad" in FIG. 2 do indicate a default redirection setting. If Bill's current profile indicates a default redirection setting, the process again continues to step 618 in which the call is processed according to the (default) redirection settings.

If checks 616 and 617 both fail, the process continues to step 619 in which the call is processed normally (no redirection or mode change).

Figure 7:
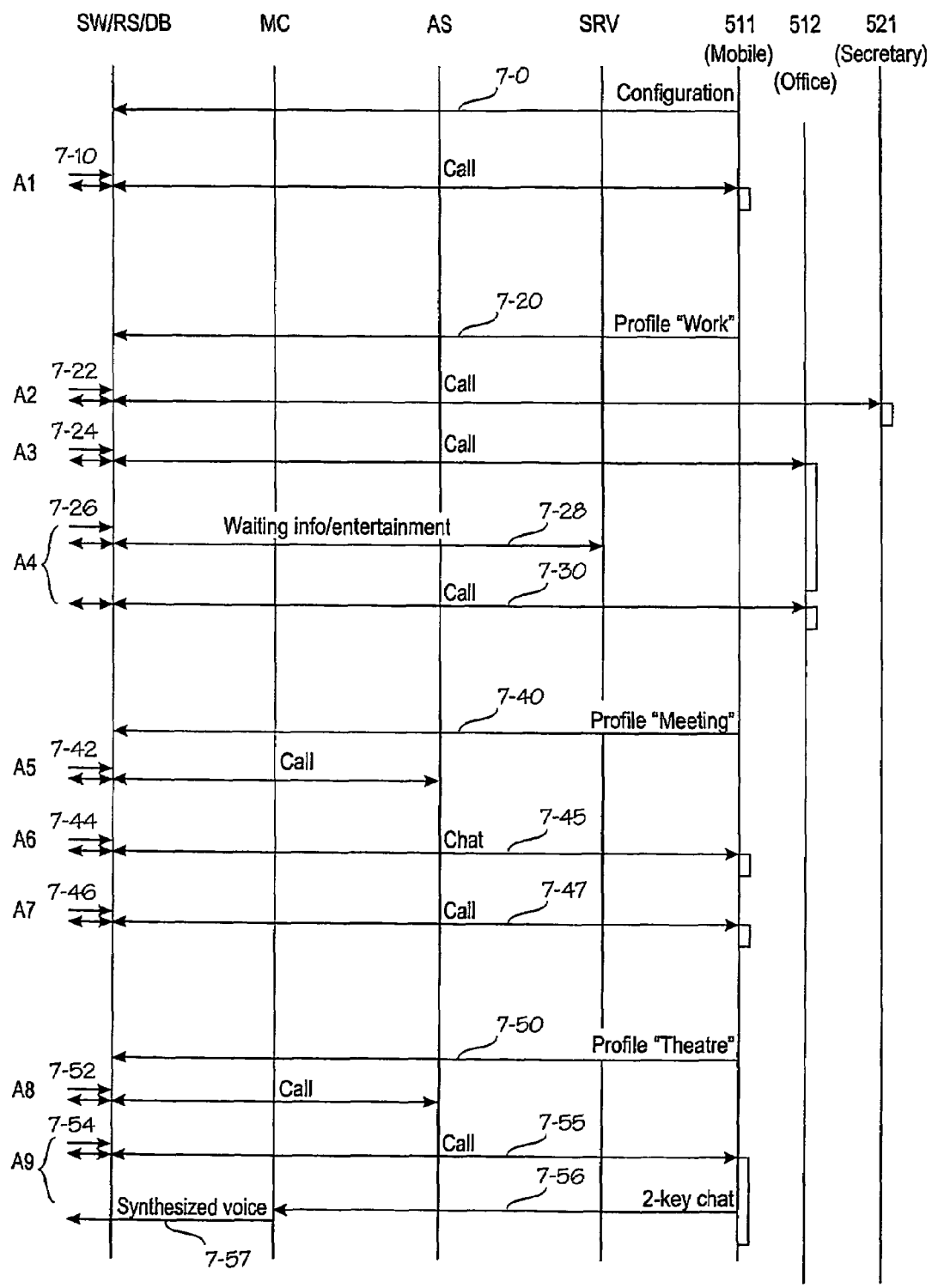
FIG. 7 is a signalling diagram illustrating a possible set of events while using a call answering/redirection mechanism according to the invention.

FIG. 7 is a signalling diagram illustrating a possible set of events in a call answering/redirection mechanism according to the invention. The elements SW, RS, DB, AS, CM and SRV have been described in connection with FIG. 5, but in FIG. 7, the reachability server RS and its database DB are integrated with the switching element SW, and the combination is denoted by SW/RS/DB. Reference signs A1, A2, etc. denote different callers (A parties). Similar to FIG. 5, reference numbers 511, 512 and 521 denote Bill's mobile and office phones and his secretary's phone, respectively.

Unless stated otherwise, we will assume that Bill's caller groups, profiles, redirection settings and associations are as shown in FIGS. 1, 2, 3 and 4, respectively. In step 7-0, Bill configures his reachability service. In other words, he sends the reachability server RS his caller groups, profiles, redirection settings and associations. This step can take place from Bill's mobile terminal 511 or from his office computer 531. We will further assume that before 8:30 am, the redirection setting "MobileFirst" (item 302 in FIG. 3) is in force for all callers.

In step 7-10, it is 8:15 am and Bill is in his car, when a first caller A1 calls. Because the "MobileFirst" setting is in force for all callers, the call is directed normally to Bill's mobile phone 511. In FIG. 7, the white rectangles to the right and below each call indicate the duration of the call in question.

In step 7-20, Bill arrives in his office and selects the "Work" profile (see items 401 to 406 in FIG. 4). Technically, his terminal only has to send the reachability server RS an indicator of the "Work" profile. Alternatively, the reachability server could automatically select the "Work" profile after a preconfigured time, such as 8:30 am. In step 7-22, a second caller A2 calls. Based on the caller line identification (CLI), the SW/RS elements detect that the second caller A2 belongs to caller group "Friends". As shown by item 404 in FIG. 4, the "Friends" group and "Work" profile are associated with redirection setting "Secretary". Accordingly, the call from the second caller A2 is redirected to secretary's telephone 521. (Naturally, the secretary may then transfer the call to Bill, but this is conventional call management and needs no explanation.) In step 7-24, Bill's secretary, shown here as A3, calls Bill. As shown by item 403 in FIG. 4, the "Secretary" group and "Work" profile are associated with redirection setting "OfficeFirst". Accordingly, the secretary's call is redirected to Bill's office telephone 512. During the secretary's call, in step 7-26, a client A4 tries to call Bill. In addition to the settings shown in FIGS. 1 to 4, we assume that the redirection setting for clients indicates that the caller is directed to the server SRV for providing the client with information or entertainment, which takes place in step 7-28. In step 7-30, the secretary's call ends and the clients call is directed to Bills office telephone 512.

In step 740, Bill changes his profile to "Meeting" (items 411 to 415 in FIG. 4). In step 742, a fifth caller A5 tries to call Bill. The fifth caller A5 is either a total stranger to Bill's caller lists or does not belong to any of his caller groups. Accordingly, this call is routed to the answer service AS. In step 7-44, one of Bill's family members A6 tries to call him. As shown by item 411, the Meeting/Family combination is associated with a redirection setting of "Chat". Accordingly, in step 745, the RS/SW elements establish a chat connection between A6 and Bill's mobile phone 511. In step 746, Bill's secretary, shown here as A7, calls Bill. As indicated by item 413, the secretary's call is processed according to settings "OfficeFirst", and the call is directed to Bill's mobile phone 511 in step 747.

In the evening, Bill changes his profile to "Theatre" in step 7-50. Preferably, the alarm of Bill's mobile phone 511 is automatically set to "silent but vibrating". In step 7-52 a member A8 of the "Friends" group tries to call Bill. As shown by item 204 in FIG. 2, the "Theatre" profile has a default redirection setting "VoiceMail". Accordingly, the call from A8 is routed to the answer service AS. In step 7-54, a family member A9 calls Bill. As shown by item 421, the Theatre/Family combination is associated with a redirection setting of "Voice/2KeyChat". This redirection setting is processed according to item 309 in FIG. 3, and an asymmetrical connection is established between the family member A9 and Bill's mobile phone 511. Bill is alerted by the vibrating alarm. In step 7-54, the family member A9 can talk and Bill can hear the incoming call with an earphone. Bill cannot respond by talking, and he cannot even take the phone out of his pocket, but, as shown by step 7-56, he can respond by "yes" and "no" keys whose locations he can memorize. (Alternatively, a single key and two or three different keystrokes can be used.) In step 7-57, his two- or three-key responses are converted to speech by a speech synthesizer in the mode converter MC. The connection between A9 and Bill will be shown in more detail in FIG. 8.

Figure 8:
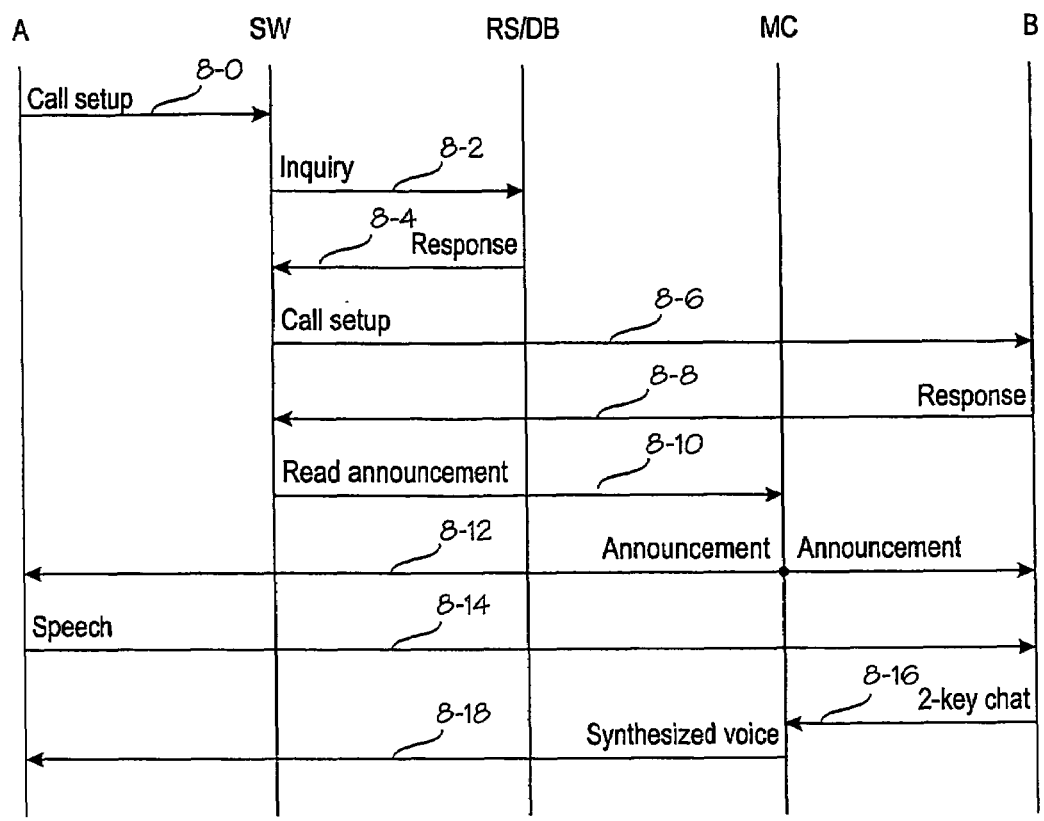
FIG. 8 is a more detailed signalling diagram illustrating an asymmetric call in which one party communicates by speech and the other by chatting.

In FIG. 7, the emphasis was on the users' view of the call routing, and some signalling between the network elements was omitted for clarity. FIG. 8 is a more detailed signalling diagram illustrating the co-operation between the various network elements. FIG. 8 shows the detailed steps to achieve the last call, shown as steps 7-54 to 7-57 in FIG. 7. This is an asymmetric call in which the calling party A communicates by speech and the called party B responds by chatting.

In step 8-0, the calling terminal A sends a call setup signal which proceeds to the switching element SW. In step 8-2, the switching element SW makes an inquiry to the reachability server RS (which in turn makes an inquiry to its database DB) concerning the current redirection setting for the calling party (see steps 611 to 615 in FIG. 6). In step 8-4, the reachability server RS returns the current redirection settings to the switching element SW. The switching element SW now knows that the current redirection setting is "Voice/2-key chat". In step 8-6, the switching element SW conveys the call setup signal to the called party B. In step 8-8, the B party responds. Now the switching element SW knows that the B party is able to take the call. The B party is able to take the call in a theatre because the terminal's alarm is set to silent/vibrating. In this example, we assume that the mode converter MC comprises a voice synthesizer. (Actually, this example needs only a few voice messages of fixed content, and the voice messages can be pre-recorded instead of synthesized.) In step 8-10, the switching element SW requests the mode converter MC to read instructions to the calling party A. In step 8-12, the mode converter MC reads a voice announcement that tells the caller A that B can hear A's voice but can only respond by "yes" or "no" (and possibly by "I don't understand"). The voice announcement is preferably read to the B party. Otherwise, B could be confused because he does not hear A's voice while A listens to the voice announcement. In step 8-14, A speaks to B. A's speech is conveyed normally to B who hears it via an earphone. In step 8-16, B responds by selecting one of the few possible responses, such as "yes". In step 8-18, the mode converter MC converts B's response to synthesized (or pre-recorded) speech. Steps 8-14 to 8-18 are repeated as many times as necessary.

In the example shown in FIG. 8, the mode converter MC performs text-to-speech conversion. If the mode converter MC comprises a speech-recognition apparatus, it is also possible to perform speech-to-text conversion. This means, for example, that the parties can have a two-way communication in which one party speaks and listens while the other party communicates by chatting. Naturally, current speech-to-text conversion is not yet mature enough to support continuous speech from an arbitrary caller in arbitrary surroundings, but speech-to-text conversion is possible with limited vocabulary and small pauses between words.

FURTHER/ALTERNATIVE EMBODIMENTS

In the examples described so far, the reachability server RS (with its associated database) was shown as a distinct network element in the fixed network. Instead of such a distinct network element, the reachability server may be implemented as a software agent in the user equipment. As a further alternative, the reachability server may be implemented as a distributed collection of software, such as a client/server system. A preferred implementation is a cooperation between a fixed reachability server and a terminal-based one. The terminal-based server is independent of the current network operator, while the network-based server is operational when the terminal is shut off or out of network coverage, or employs in-flight settings or the like. The settings in the fixed and terminal-based servers should be synchronized whenever one or more of the settings change.

Also, the examples described above were based on the assumption that each person can belong to one caller group only. For instance, if a person is in a "Company" group, he/she cannot be in a "Family" group. Call processing can be even more flexible if persons can belong to multiple groups simultaneously. For example, Bill's wife could belong to the "Family" group and "Wife" group. In this way, Bill can easily set different settings for his wife in extraordinary situations, while calls is most situations are processed according to the settings of the "Family" group.

If the caller belongs to multiple groups, a natural question is: which group's settings will be used? One way to answer this question is to set explicit priorities for the groups. For example, the settings of the higher-priority group are used, if they exist. Otherwise, the settings of the lower-priority group are used. Alternatively, the call modes or redirection settings can be ranked. This means that a normal call to the number selected by the caller has the highest ranking. If Bill's wife belongs to the "Wife" and "Family" groups, and the "Wife" group allows a normal call and the "Family" groups indicates redirection to voice mail, the higher-ranking normal call will be established.

Figure 9:
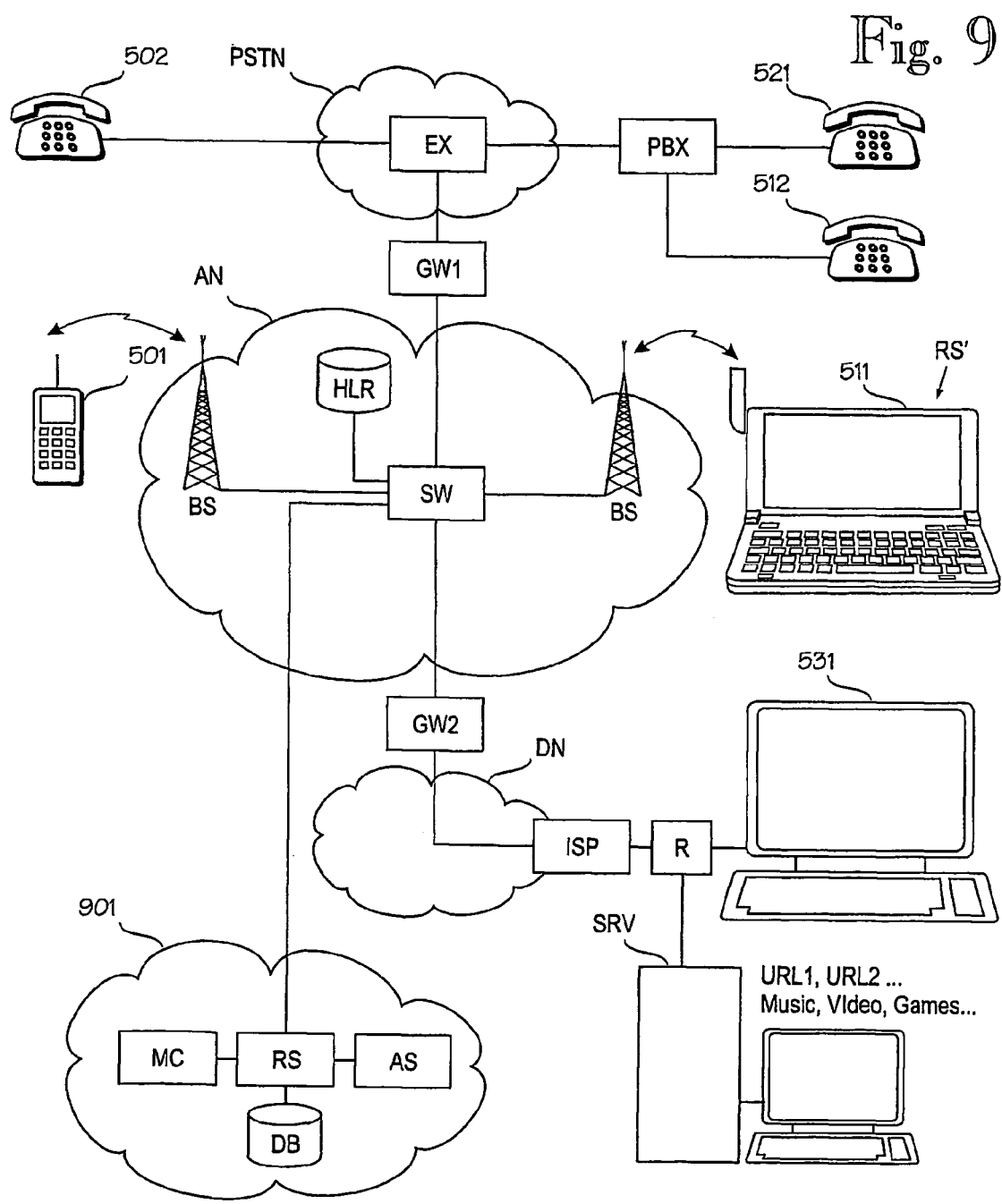
FIG. 9 shows an alternative network architecture in which the reachability server RS is located in a network other than the access network.

FIG. 9 shows an alternative network architecture in which the reachability server RS, along with its associated elements mode converter MC, answering server AS and database DB, are located in a network 901 that is not the access network AN serving the B user (Bill in the previous examples). For example, the network 901 may be an intelligent network; a data network, such as the Internet or the Public Switched Telephone Network PSTN. As regards this embodiment, the type of the network 901 it is not essential. For example, the reachability service according to the invention may be offered by an independent service operator that does not have access to all the facilities of the switching element SW. Regardless of the type of the network 901, if the network 901 is not the access network AN serving the B user, there is a residual problem of conveying the B party's identity to the reachability server RS. There are at least two ways to solve that residual problem.

One way to convey the B party's identity to the reachability server RS is to modify the signalling between the switching element SW and the reachability server RS. For example, a call setup signal to the reachability server RS may include the B party's identity as an additional parameter.

Another way to convey the B party's identity to the reachability server RS is to use virtual numbers. If this technique is used, each potential B party must register with the reachability server RS. The RS has a portion of the number space of the SW, the portion being large enough to accommodate all potential B parties served by the reachability server RS. For each potential B party, a virtual number is allocated from that portion. When the reachability service for a given B party is activated, that B party's calls are directed from the switching element to the virtual number within the reachability server RS. Based on the virtual number, the reachability server RS knows the B party's identity.

Figure 10:
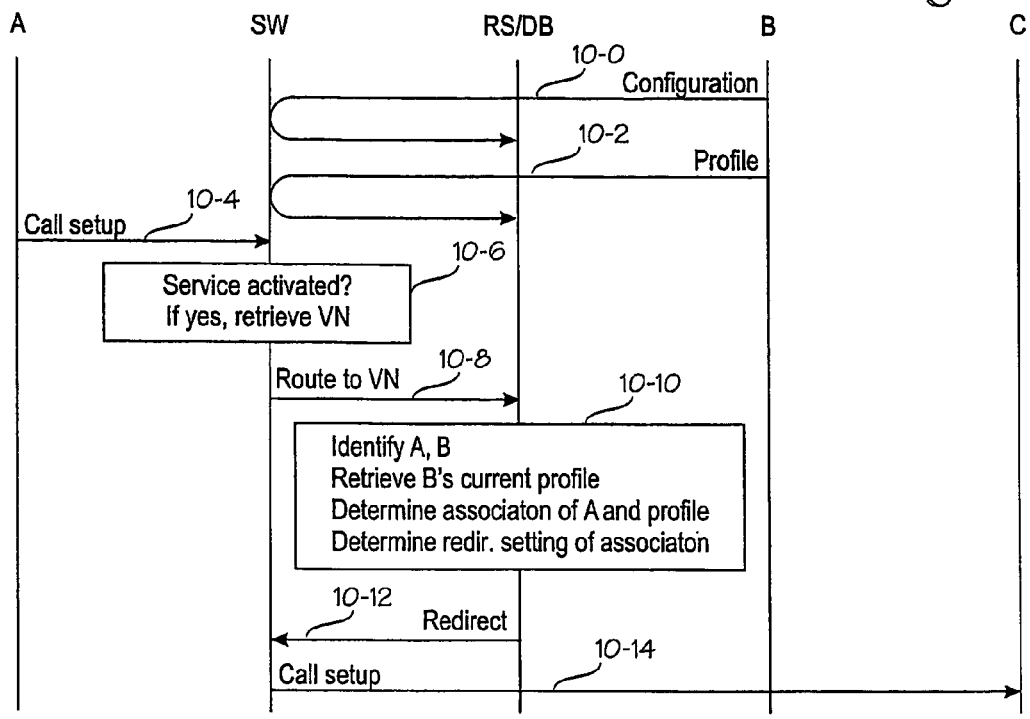
FIG. 10 illustrates the use of virtual numbers in a system in which the reachability server is not in the access network.

FIG. 10 illustrates the use of virtual numbers in a system in which the reachability server is not in the access network. In step 10-0, the B party sends his configuration information, that is, his caller groups, profiles, redirection settings and associations. In step 10-2, the B party sends his current profile information. The configuration information and the current profile information are routed via the access network's switching element SW to the reachability server RS in which they are stored in the database DB. In step 10-4, an A party places a call to the B party. The call setup request is conveyed to the switching element SW that checks in step 10-6 if the B party has activated the reachability service, that is, the call redirection/answering service according to the invention. If the service is not activated, the switching element SW routes the call conventionally, but this is not shown in FIG. 10. We assume that the service is activated, and the switching element SW retrieves the virtual number of the B party. In step 10-8, the switching element SW routes the call to the B party's virtual number that is allocated from the portion of the number space allocated to the reachability server RS. Accordingly, the call is routed to the reachability server RS. In step 10-10, the reachability server RS identifies the A and B parties. A can be identified on the basis of the calling line indicator (CLI). B is identified on the basis of his unique virtual number. Next, the reachability server RS retrieves B's current profile, determines the association that matches A and the current profile, and determines the redirection settings of that association. We assume that in this case, the call is to be routed to a C party. Thus in step 10-12, the reachability server RS routes the call to the C party, and in step 10-14, the call setup signalling is redirected from the switching element to the C party. All the different redirection options and mode changes described earlier are also possible if the reachability server RS is in a network other than the access network, but interoperation between the reachability server RS and the switching element SW is slightly more complex because conventional call setup signalling loses the true B party's identity information if the switching element SW merely routes all calls to the reachability server RS. This is why there is a unique virtual number allocated to each registered user (potential B party to an incoming call).

Figure 11:
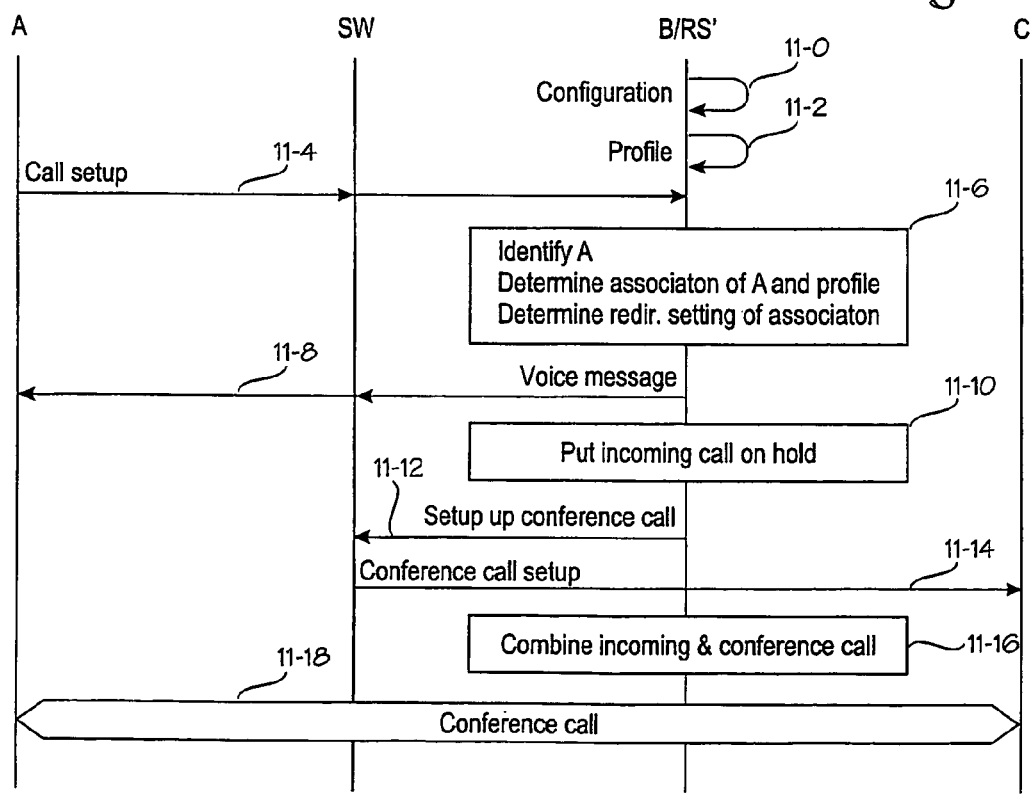
FIG. 11 illustrates call routing in a system in which the reachability server is implemented in the B party's terminal.

FIG. 11 illustrates call routing in a system in which the reachability server RS' (see FIG. 5) is implemented in the B party's terminal. Such a terminal-based reachability service is practical in a situation in which the terminal is out of its home network or if the home network operator does not offer such services. It was stated earlier that multimedia-enabled terminals can act as answering machines if suitably programmed. What is more difficult is to have a terminal route calls to another number. FIG. 11 illustrates one solution to this problem. This solution is based on a conference call in which the B user (the person) does not participate in the call. In step 11-0, the B user configures the reachability service.

In step 11-2, he selects a current profile. As was explained in connection with the previous examples, the configuration information changes rarely, whereas the current profile is changed each time the B user's reachability status changes. In step 11-4, B's terminal receives a call from an A party. The call setup signalling is conveyed via the switching element SW, but this part of the call setup is entirely conventional. In step 11-6, the reachability server RS', which may be a software agent in the B user's terminal, identifies the A user, determines the association that matches A and the current profile, and determines the redirection settings of that association. We assume that in this case, the call is to be routed to a C party. In other words, the B terminal must route the call to C. Such terminal-based call routing can be accomplished, without any proprietary signalling, by setting up a conference call. Prior to call routing, in step 11-8, the B terminal may send a voice message to the A party, informing him that the B user cannot take the call and the call is being routed to another number. In step 11-10, the B terminal, under control of the server RS', put the incoming call on hold. In step 11-12, the B terminal requests the switching element SW to set up a conference call with C. In step 11-14, the conference call is set up. In step 11-16, the B terminal combines the incoming call from the A party with the conference call to the C party. After connecting the A party with the C party, the B terminal could hang up, although some networks do not allow the originating party of the conference call to hang up. In step 11-18, the A and C parties continue the conference call. As a further alternative, the B terminal can record the conversation between the A and C parties.

If the reachability service according to the invention is implemented both in the fixed network (the access network AN or some other network) and in the terminal, the configuration and profile information between them should be synchronized. Such synchronization can take place periodically or whenever the settings change or when the terminal is about to lose network coverage or has just entered network coverage.

An advantage of the invention is that the terminal user has to send the reachability server only one piece of information, namely an indicator of the current profile, whenever the reachability conditions change. The caller groups, profiles and redirection/call mode settings are pre-stored and are changed much less often. Because the caller groups, profiles and redirection/call mode settings are pre-stored at the reachability server (or are otherwise accessible by it), call processing is much more flexible than in a system which only supports a single redirection setting to all callers.

It is readily apparent to a person skilled in the art that, as the technology advances, the inventive concept can be implemented in various ways. The invention and its embodiments are not limited to the examples described above but may vary within the scope of the claims.

Acronyms (some are not official)
CLI: Calling Line Indicator
GSM: Global System for Mobile Communication
ISP: Internet service provider
MMS: Multimedia Messaging Service (Specification)
MSISDN: Mobile Subscriber Integrated Services Data Network
PBX: private branch exchange
PSTN: Public Switched Telephone Network
SIM: Subscriber Identity Module
TCP/IP: Transport Control Protocol/Internet Protocol
UMTS: Universal Mobile Telecommunications System
URL: Uniform Resource Locator
VoIP: Voice over Internet Protocol

The invention claimed is:

1. A method for handling a call setup request from a calling party to a called party, the method comprising:
maintaining, for the called party, multiple simultaneous caller groups, each caller group comprising one or more members, multiple simultaneous profiles, multiple simultaneous redirection settings, and multiple simultaneous associations of a caller group, a profile and a redirection setting;
for each of several changes of reachability of the called party, receiving an indication of a current profile of the called party;
based on the call setup request, determining the identity of the calling party;
based on the determined identity of the calling, determining one of the multiple simultaneous caller groups;
determining one of the multiple associations that corresponds to the determined caller group and the current profile of the called party;
processing the call setup request according to the redirection setting of the determined association.

2. The method according to claim 1, further comprising maintaining the multiple simultaneous caller groups, profiles, redirection settings and associations and processing the call setup request in a fixed network element.

3. The method according to claim 1, further comprising maintaining the multiple simultaneous caller groups, profiles, redirection settings and associations and processing the call setup request in a terminal of the called party.

4. The method according to claim 1, further comprising maintaining the multiple simultaneous caller groups, profiles, redirection settings and associations both in a fixed network element and in a terminal of the called party.

5. The method according to claim 2, wherein the fixed network element is in an access network serving the called party.

6. The method according to claim 2, wherein the fixed network element is in a network other than the access network serving the called party.

7. The method according to claim 6, further comprising:
assigning a unique virtual number to the called party;
routing the call setup request to the virtual number of the called party;
determining the called party's identity based on the virtual number.

8. The method according to claim 3, further comprising routing a call to a third party by setting up a conference call between the calling party and the third party.

9. The method according to claim 1, wherein the redirection setting indicates that an incoming call is to be routed to a different number or network address.

10. The method according to claim 1, wherein the redirection setting indicates a changed call mode, and the method comprises processing the call setup request according to the changed call mode.

11. The method according to claim 10, wherein the changed call mode indicates an asymmetric call in which the calling party and called party use different call modes.

12. The method according to claim 10, wherein the changed call mode is a silent communication for at least one of the calling party or the called party.

13. The method according to claim 12, wherein the silent communication is chatting.

14. The method according to claim 12, wherein the silent communication is limited chatting.

15. The method according to claim 11, wherein the method comprises voice-to-text conversion and/or text-to-voice conversion.

16. The method according to claim 12, wherein if the current profile of the called party indicates silent communication for the called party, the called party's terminal is automatically set to silent.

17. The method according to claim 1, wherein the profile comprises presence information which is returned to the calling party.

18. A The method according to claim 1, wherein determining one of the multiple simultaneous caller groups comprises determining all caller groups which the calling party belongs to, and selecting one of the determined caller groups.

19. A reachability server for handling a call setup request from an calling party to a called party, the reachability server comprising:
   a database for maintaining, for the called party, multiple simultaneous caller groups, each caller group comprising one or more members, multiple simultaneous profiles, multiple simultaneous redirection settings, and multiple simultaneous associations of a caller group, a profile and a redirection setting;
   input unit configured to receive an indication of a current profile of the called party each time the reachability of the called party changes;
   a caller identifying unit configured to determine an identity of calling party based on the call setup request;
   a caller group determining unit configured to determine one of the multiple simultaneous caller groups based on the determined identity of the calling party;
   an associations determining unit configured to determined one of the multiple associations that corresponds to the determined caller group and the current profile of the called party; and
   a call processing unit configured to process the call setup request according to the redirection setting of the determined association.

20. The reachability server according to claim 19, wherein the reachability server is located in an element of a fixed network.

21. The reachability server according to claim 19, wherein the reachability server is located in a terminal of the called party.

22. A reachability server for handling a call setup request from an calling party to a called party, the reachability server comprising:
   a database for maintaining, for the called party, multiple simultaneous caller groups, each caller group comprising one or more members, multiple simultaneous profiles, multiple simultaneous redirection settings, and multiple simultaneous associations of a caller group, a profile and a redirection setting;
   input means for receiving an indication of a current profile of the called party each time the reachability of the called party changes;
   caller identifying means for determining the an identity of the calling party based on the call setup request;
   caller group determining means for determining one of the multiple simultaneous caller groups based on the determined identity of the calling party;
   associations determining means for determining one of the multiple associations that corresponds to the determined caller group and the current profile of the called party; and
   call processing means for processing the call setup request according to the redirection setting of the determined association.

* * * * *